United States Patent Office 3,260,203
Patented July 12, 1966

3,260,203
CARTRIDGE CASES FROM FIBROUS NITROCELLULOSE AND ALKALINE CATALYZED PHENOLIC RESIN
John N. Godfrey, Alexandria, and Myron G. De Fries, Fairfax County, Va., assignors to Atlantic Research Corporation, Fairfax County, Va., a corporation of Virginia
No Drawing. Filed Feb. 18, 1965, Ser. No. 433,849
12 Claims. (Cl. 102—43)

This invention relates to a new and improved composition for making shaped, felted, fibrous combustible product having ballistically desirable physical properties when dried. More specifically, it relates to a composition containing a new and improved thermosetting resin binder for the components of the product. It further relates to the method for preparing the combustible product.

Broadly speaking, the invention relates to a composition for making combustible product, said composition comprising nitrocellulose fibers, cellulose fibers, water-dispersed phenol-formaldehyde resin, and precipitant for said resin homogeneously dispersed in water.

Particularly, the invention includes the composition comprising a homogeneous dispersion in water of the following ingredients: (a) dispersed fibers consisting essentially of 1 to about 99 parts by weight of nitrocellulose fibers and about 1 to 5 parts of cellulose fibers, (b) resin binder compatible with said nitrocellulose, said binder consisting essentially of an alkaline catalyzed reaction product of phenol and formaldehyde controlled to yield a resin with a viscosity of at least 200 cps. and having at least 200% water tolerance at about 50–60% solids content, and (c) precipitant for said binder, said precipitant consisting essentially of halogen salt of a trivalent metal, the weight ratio of the binder to the total weight of fibers, both measured on dry basis, being in the range of from about 1:2 to about 1:7.

Our composition contains a novel resin binder which when precipitated in the presence of the other ingredients of the composition according to the invention results in very high retention of the resin binder on the nitrocellulose-cellulose fibers during the deposition cycle used in preparation of the combustible product of the invention. When heated to temperatures sufficient to effect resin cure and to remove water, the dried combustible product is found to have physical properties meeting the high standards required for ballistics applications. Furthermore, the wet strength of the fibrous product during the matting or molding stage is found adequate for handling of the wet mass without crumbling.

The composition of this invention is useful in the manufacture of combustible products containing nitrocellulose fibers in felted form. The composition is particularly useful in the manufacture of combustible cartridge casings. Combustible products prepared by practice of this invention can be shaped into a variety of forms depending on the intended use of the product. Thus, the product can be shaped in the form of flat sheet, tape of suitable thinness, hollow forms, tubing, foraminous sheets, and specific molded shapes, such as that of a cartridge casing. The product also can be cut to any desired form. In each of these forms, the combustible properties of the product will be available as a source of heat energy and as a combustible product leaving little or no residue upon combustion. The amount of resin binder present can be varied to make the product rigid or more or less flexible as desired for a particular use.

Processes for making combustible cartridge casings are known. See, for example, our U.S. Patent 3,139,355, issued June 30, 1964, for "Process for Making a Fibrous Cellulose and/or Nitrocellulose Product". Combustible cartridge cases also are discussed in Ordnance, Vol. XLVII, No. 254, pages 231–234 (1962).

A principal objective in using a resin binder in a combustible cartridge casing formulation containing nitrocellulose and cellulose fibers is to obtain an overall rigidity in the cured casing so that mechanical tolerances can be set and maintained, while at the same time the product is made strong enough to resist impact and abrasion during handling and storage.

The use of phenol-formaldehyde resins as binders for fibrous felted cellulose materials is known in the felting art. However, while it may be expected that a resin which is suitable for binding cellulose fibers physically may be useful for binding nitrocellulose, it cannot be expected that the resin will be compatible with nitrocellulose throughout manufacture and shelf life of the felted product. It is critical that there be little or no degradation of the nitrocellulose in the wet stage in the curing and drying stages, and during storage of the felted product. Accordingly, the resin used to bind nitrocellulose fibers must not contain ingredients which will react adversely with nitrocellulose. Also, the resin must serve adequately to seal the fibers so that when the combustible product is placed in direct contact with a propellant material containing a material which has a tendency to migrate, e.g., nitroglycerin in a plastic binder, the fibers will not absorb the material. Moreover, the resin must not leave substantial amounts of residues such as halogens, sulfur or metals which will contaminate a weapon in which the combustible cartridge case is used. The resin must not cause corrosion, and the resin itself must be sufficiently combustible so that efficiency of the product as a combustible material is not impaired.

According to the present invention, a particularly advantageous thermosetting phenol-formaldehyde resin composition has been found which meets the above necessary binder requirements. The advantageous properties of the combustible product obtained by means of our phenol-formaldehyde resin as used in practicing our invention is achieved in part through use in the composition of the invention of a precipitant consisting essentially of a halogen salt of a trivalent metal, preferably aluminum chloride, which serves to impart encapsulation and cationic properties to the resin binder at a pH in the range of about 6.5 to 6.8, upon precipitation of the resin onto the fibers before removal of the water phase.

Methods for preparation of phenol-formaldehyde resins are well-known in the art. Each manufacturer of such resins can usually supply a variety of resins, each designed for a particular end use. See, for example, The Chemistry of Phenolic Resins, Robert W. Martin, John Wiley & Sons, Inc., New York (1956). By variation in ratios of phenol to formaldehyde, by use of various catalysts, and by selection of appropriate temperatures of reaction, manufacturers of such resins can provide resins of particular viscosities, pH ranges, solids content, cure temperatures and water tolerances. For practice of this invention, it is essential that the phenol-formaldehyde resin used have a Brookfield viscosity of at least 200 cps., preferably from about 225 to 400 cps., and that it have a water tolerance of at least 200%, preferably 250 to 450%, at about 50–60% solids content. It is also essential that the resin be in the neutral or slightly basic pH range, preferably having a pH of about 6.5 to 6.8. A phenol-formaldehyde resin meeting this necessary specification can readily be supplied by a manufacturer of phenol-formaldehyde resins, and manufacture of such resin is not part of the present invention.

A phenol-formaldehyde resin meeting the above requirements and one especially preferred for practicing the invention is commercially available as Synco Resin No. 742. The resin as received for use from the manufacturer contains approximately 55% dry solids content in water. Typical properties of the preferred resin are as follows:

ASTM solids, percent _____ 55.8
Brookfield viscosity, cps. _____ 260
150° F. hotplate cure, seconds _____ 22
Water tolerance, percent _____ 400

The amount of resin binder in the composition of the invention must be adequate to provide rigidity and high tensile strength in the final product when rigidity and strength are necessary properties in the combustible product, e.g. in a combustible cartridge casing. When a flexible combustible product is desired, less binder can be used. The amount of binder resin must be adequate to seal the fibers against penetration by other materials, especially nitroglycerin and water. It must be adequate to provide rigidity and to maintain physical dimensions within tolerances required in the combustible product. The amount of resin binder used in the composition of the invention, on a dry weight basis, can range from a ratio of 1 part resin to about 1 part mixed fibers to a ratio of 1 part resin to about 7 parts mixed fibers. Preferably the amount used is in the range of 1 part resin to 4 parts mixed fibers.

The amount of cured resin binder in the dried combustible product formed by practice of the invention can range from about 16% to about 33% by weight. Preferably, the amount present will be between 18 and 22% by weight.

The halogen salt of a trivalent metal used to precipitate the phenol-formaldehyde resin from the water phase can be a chloride, bromide, fluoride or iodide of aluminum, bismuth, chromium, or nickel. Aluminum chloride is preferably used. This precipitant quickly and effectively precipitates nearly all the resin from the dispersed phase and is deemed essential for obtaining the high rate of resin deposition on the fibers obtained in practice of the invention.

The amount of precipitant used should be sufficient to cause rapid precipitation of the phenol-formaldehyde resin from its water dispersion. An amount of from about 2 to 7% based on the weight of wet resin in the form of a 50–60% solids content dispersion, such as Synco Resin No. 742, can be used. About 4% by weight of wet resin is preferred. On a dry basis, i.e., based on net resin content, about 4% to 14% is used. Use of more than the stated amount of precipitant should be avoided since physical properties such as tensile strength can be adversely effected by excess precipitant.

The resin binder as disclosed by this invention has the advantage that when it is precipitated in the presence of the mixture of nitrocellulose and cellulose fibers by the addition of the precipitant as much as about 95% of the resin binder quickly is deposited in and upon the fibers and remains adhesively deposited there when the water phase of the dispersion is removed by the usual means, e.g., filters. As an important advantage of this result, recycling of large quantities of dispersed resin binder in the filtrate, which can be as much as ¾ of the total original binder content when other binder resins are used, is eliminated.

In practicing the invention to prepare a combustible product, the fibers and resin binder can be mixed in advance of use in the absence of the precipitant and the precipitant then can be added shortly before matting or deposition of the fibers on a forming structure is to be done.

Also, in practicing the invention, a small quantity of defoaming agent preferably is included in the composition when the resin binder is dispersed into the fiber mass in the water. Defoaming agents useful for practicing the invention are commercially available. A preferred one is polyethylene glycol, e.g., Polyglycol E-300.

Nitrocellulose fibers used in practice of the invention are known in the art. The nitrocelluse fibers can be derived from natural sources or they can be synthetically prepared by extrusion of nitrocellulose and disintegration of the extrudate. Nitrogen content of the nitrocellulose should be in the range of 10.5–13.5%

Nitrocellulose derived from wood pulp or cotton linters and having 12.6% nitrogen content, viscosity of 12–15 seconds, and fineness of 100–110 is especially preferred for manufacture of a highly combustible cartridge casing and for practice of the invention.

It is known in the art to stabilize nitrocellulose by the incorporation of well-known stabilizers into a composition containing the nitrocellulose, and such stabilizers preferably are used to practice the invention. A preferred stabilizer is diphenylamine. The diphenylamine is preferably dissolved in an organic solvent, e.g., methanol, for ease in addition to the aqueous suspension containing the nitrocellulose fibers.

The cellulose fibers used as described herein can be any commercially employed in paper making such as sulfate, sulfite, rag and ground wood, bleached or unbleached. Synthetic fibers such as viscose rayon fibers also can be used. Bleached sulfate kraft fibers are preferred. The fibers can be used in the form of the slurry obtained from a beater, or in the form of dry fibers, which are then reslurried. The nitrocellulose fibers similarly can be employed in any commercially available form.

The fibers in the combustible product, in web or mat or shaped form, can consist almost entirely of nitrocellulose fibers. Fineness of the fibers is not critical and commercially available sizes of fibers are preferably used. The cellulose fibers serve to provide strength to the product and help to control other properties of the composite mat, such as rate of burning and flame temperature.

The ratio of nitrocellulose fibers to cellulose fibers will generally be determined by a particular intended application and can vary from as little as 1:8 to as much as 5:1 parts by weight. Preferably, a mixture consisting of a major portion of nitrocellulose and a minor portion of cellulose fibers is used. A ratio in the range of 1:1 to 1:8 parts by weight of nitrocellulose to cellulose fibers is especially preferred.

The amount of water used in practicing the invention is not critical, and a quantity of water consistent with efficient dispersion of the fibers and resin binder in the form of a fluid mass should be used. Preferably about 300 to 800 parts by weight of water to 1 part of combined solids in the mass are used. The resin binder preferably is used in the form of a dispersion containing 50–60% solids and the nitrocellulose preferably is used as a wet slurry. Sufficient additional water then is added to disperse all the fibers freely and to effect homogeneity of the mass when the binder is added and precipitated in the slurry.

After deposition of the fibrous mass, heating is applied to cure the precipitated phenol-formaldehyde resin binder. Curing occurs at a temperature as low as 120° F., but a temperature of about 160° F. is preferably used. Curing preferably is carried out as part of the drying step which necessarily is used to remove moisture from the deposited product.

Drying of the fibrous deposited mass is carried out by heating the mass at moderately elevated temperatures. Vacuum can be advantageously used during the drying step. Although sensitivity of the nitrocellulose is reduced by the presence of the phenol-formaldehyde resin binder, excessively high temperatures during drying must be avoided in order to prevent auto-ignition of the mass.

Preparation and use of the composition of this invention is described in the following examples. Unless otherwise stated, all parts are by weight.

*Example 1*

4 parts of dry, bleached kraft fiber are slurried in 1940 parts of water and beaten in an Osterizer high speed mixer for about one minute. 24 parts of water-wet nitrocellulose fibers (smokeless, 12.6% N, 15 seconds, approximately 25% water) are then added to the water-kraft fiber mixture, and the mass is then agitated for about another minute. 0.3 part of diphenylamine, dissolved in methanol, are then added to the mixture. 27 parts of Synco Resin No. 742, containing 12.8 parts of water-dispersed phenol-formaldehyde resin (dry weight basis) are mixed with 0.5 part of Polyglycol E-300 defoamer. The resin binder dispersion is then added to the mixer containing the mixture of fibers. The mass is agitated for about another three minutes, or until the resin binder is thoroughly dispersed in the mass. 0.4 part of aluminum chloride in the form of 5% water solution is then added to the mass in the mixer and stirring is continued for several more minutes. The slurry is now ready for use to prepare fibrous mats or shaped forms.

*Example 2*

A portion of the mass of slurry prepared as described in Example 1 was filtered on a Büchner funnel under vacuum using 50 mesh wire screen to retain the fibers. Excess water was removed by pulling air through the mat which formed. Application of the vacuum was continued until substantially all of the liquid in the slurry had passed through. Analysis of the filtrate showed a content of less than 5% of the original total phenol-formaldehyde resin content was present in the filtrate.

*Example 3*

The impregnated mat from Example 2 was removed from the funnel, pressed for one minute at 200 p.s.i., using a Carver press, and then cured and oven-dried for one hour at 165° F.

The dried mat burned satisfactorily when ignited, leaving substantially no residue.

*Example 4*

A portion of the slurry prepared as described in Example 1 was introduced into a mold adapted for deposition of a felting on a mandrel in the form of a cartridge casing. Analysis of filtrate from the deposited felted fibers showed that about 95% of the original phenol-formaldehyde resin content was deposited on the fibers. The wet deposited cartridge casing was removed from the mold, placed on a drying mandrel, and placed in an oven at 160° F. until cured and dry (about fifty minutes). At the end of the drying period, the cartridge casing was found to be within production tolerances as to dimensional specifications. The cartridge casing was examined further and found to be impregnated uniformly with the phenol-formaldehyde resin. The casing was tough, hard, smooth surfaced, and in water test, found to be moisture proof. Tests on a Tinius-Olsen testing machine showed a sample of the casing sidewall to have average maximum tensile stress of about 350 p.s.i. and to have a Young's modulus of about 40,000. The cartridge case was ignited and was found to burn satisfactorily, leaving substantially no residue.

Although this invention has been described with reference to illustrative embodiments thereof, it will be apparent to those skilled in the art that the principles of this invention may be embodied in other forms within the scope of the appended claims.

We claim:
1. A composition for making a shaped combustible product, said composition comprising nitrocellulose fibers, cellulose fibers, water-dispersed phenol-formaldehyde resin and precipitant for said resin homogeneously dispersed in water.
2. The composition according to claim 1 in which the resin is an alkaline catalyzed reaction product of phenol and formaldehyde controlled to yield a resin with a viscosity of at least 200 cps. and having at least 200% water tolerance with at least 50% solids content dispersed in water.
3. The composition according to claim 1 in which the nitrocellulose/cellulose/resin are present in proportions of 1-5/1-2/1 parts by weight.
4. The composition according to claim 1 in which the precipitant is effective to cause optimum precipitation of the resin binder from its aqueous suspension at a pH in the range of about 6.5 to 6.8.
5. The composition according to claim 4 in which the precipitant is halogen salt of a trivalent metal.
6. The composition according to claim 5 in which the precipitant is aluminum chloride.
7. A composition for making a shaped combustible product having high tensile strength when cured and dried comprising a homogeneous dispersion in from about 350 to 700 parts by weight of water of the following ingredients: (a) dispersed fibers consisting essentially of 1 to about 99 parts of nitrocellulose fibers and 1 to 5 parts of cellulose fibers and (b) resin binder compatible with said nitrocellulose, said binder consisting essentially of an alkaline catalyzed reaction product of phenol and formaldehyde controlled to yield a resin with a Brookfield viscosity of at least 200 cps. and a water tolerance of at least 200% at about 50–60% solids content, and (c) precipitant for said binder, the dry weight ratio of the binder to the mixture of fibers being in the range of from about 1:2 to about 1:7.
8. The composition according to claim 7 in which the precipitant is halogen salt of a trivalent metal.
9. The composition according to claim 7 in which the precipitant is aluminum chloride.
10. A process for preparing rigid, shaped, felted, fibrous combustible product having high tensile strength comprising the steps of (a) treating a homogeneous aqueous mixture consisting essentially of an aqueous suspension of 1 to about 5 parts of nitrocellulose and about 1 to 2 parts of cellulose fibers, and 1 part of resin binder consisting essentially of an alkaline reaction product of phenol and formaldehyde controlled to yield a resin with a viscosity in the range from about 200 to 400 cps. and about 250–400% water tolerance at about 50–60% solids content, with an amount of halogen salt of a trivalent metal sufficient to precipitate said resin binder, (b) removing excess water from said mixture to deposit a fibrous mass, (c) shaping said mass, and (d) heating said mass at 120–180° F. until dry.
11. The method of making a rigid combustible product comprising homogeneously mixing nitrocellulose fibers, cellulose fibers, water dispersed phenol-formaldehyde resin, precipitant for said resin, and water; removing a major amount of the water to leave a wet fibrous mass; molding said mass; and heating said mass to a temperature in the range of about 120–180° F. until dry.
12. A combustible cartridge casing comprising a major amount of nitrocellulose fibers and a minor amount of cured alkaline catalyzed reaction product of phenol and formaldehyde controlled to yield a resin having a Brookfield viscosity of at least 200 cps. and a water tolerance of at least 200% at about 50–60% solids content.

References Cited by the Examiner
UNITED STATES PATENTS

| | | | |
|---|---|---|---|
| 2,991,168 | 8/1961 | Nadel | 149—2 |
| 3,092,525 | 6/1963 | Cook | 149—2 |
| 3,102,833 | 9/1963 | Schulz | 149—2 |

References Cited by the Applicant
UNITED STATES PATENTS

| | | |
|---|---|---|
| 3,139,355 | 6/1964 | De Fries et al. |

BENJAMIN R. PADGETT, *Acting Primary Examiner.*